United States Patent
Jin et al.

(10) Patent No.: US 11,028,914 B2
(45) Date of Patent: *Jun. 8, 2021

(54) VEHICLE DIFFERENTIAL DEVICE

(71) Applicant: JTEKT Corporation, Osaka (JP)

(72) Inventors: He Jin, Kariya (JP); Tomoki Yoshihama, Kariya (JP); Kenji Asami, Hiki-gun (JP); Songjie Li, Okazaki (JP)

(73) Assignee: JTEKT Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,243

(22) Filed: Nov. 21, 2019

(65) Prior Publication Data

US 2020/0173530 A1 Jun. 4, 2020

(30) Foreign Application Priority Data

Nov. 29, 2018 (JP) .............................. JP2018-224117
Mar. 19, 2019 (JP) .............................. JP2019-050718

(51) Int. Cl.
*F16H 48/06* (2006.01)
*F16H 57/037* (2012.01)
*F16H 48/38* (2012.01)

(52) U.S. Cl.
CPC ............. *F16H 48/06* (2013.01); *F16H 48/38* (2013.01); *F16H 57/037* (2013.01)

(58) Field of Classification Search
None
See application file for complete search history.

(56) References Cited

U.S. PATENT DOCUMENTS

| 3,375,736 A | * | 4/1968 | Saari | ....................... F16H 48/11 |
| | | | | 475/160 |
| 5,415,601 A | * | 5/1995 | Cilano | ................... F16H 48/285 |
| | | | | 475/160 |
| 5,529,547 A | * | 6/1996 | Okuda | ................... F16H 48/285 |
| | | | | 475/249 |
| 5,599,250 A | * | 2/1997 | Nakajima | .............. F16H 48/285 |
| | | | | 475/248 |
| 5,685,795 A | * | 11/1997 | Takahashi | .............. F16H 48/285 |
| | | | | 475/248 |

(Continued)

FOREIGN PATENT DOCUMENTS

JP          2009-197976 A      9/2009

*Primary Examiner* — Dirk Wright
(74) *Attorney, Agent, or Firm* — Oblon, McCelland, Maier & Neustadt, L.L.P.

(57) ABSTRACT

A vehicle differential device includes a plurality of pinion gear sets. Each of the pinion gear sets includes a first pinion gear configured to mesh with a first outer helical gear and a plurality of second pinion gears configured to mesh with a second outer helical gear. The first pinion gear integrally includes an axially one end side gear portion configured to mesh with the first outer helical gear and an axially other end side gear portion configured to mesh with the second pinion gears. The second pinion gears are configured to mesh with the second outer helical gear at positions separated from each other in a circumferential direction of the second outer helical gear, and the axially other end side gear portion of the first pinion gear is configured to mesh with the second pinion gears at positions radially outward of the second outer helical gear.

5 Claims, 4 Drawing Sheets

(56) References Cited

U.S. PATENT DOCUMENTS

| | | | | |
|---|---|---|---|---|
| 5,735,766 | A * | 4/1998 | Sacchettini | B60K 17/346 |
| | | | | 475/249 |
| 5,957,801 | A * | 9/1999 | Barnes, II | F16H 48/285 |
| | | | | 475/249 |
| 5,971,882 | A * | 10/1999 | Nishiji | F16H 48/285 |
| | | | | 475/252 |
| 6,066,064 | A * | 5/2000 | Nishiji | F16H 48/05 |
| | | | | 475/230 |
| 6,634,979 | B1 * | 10/2003 | Quaife | F16H 48/285 |
| | | | | 475/249 |
| 7,097,585 | B2 * | 8/2006 | Nishiji | F16H 48/285 |
| | | | | 475/248 |
| 8,012,058 | B2 * | 9/2011 | Fujii | F16H 48/285 |
| | | | | 475/249 |
| 8,057,352 | B2 * | 11/2011 | Nishiji | F16H 48/285 |
| | | | | 475/344 |
| 8,070,641 | B2 * | 12/2011 | McVea | F16H 48/10 |
| | | | | 475/249 |
| 9,366,333 | B2 * | 6/2016 | Tsuda | F16H 48/11 |
| 9,382,990 | B2 * | 7/2016 | Nolte | F16H 48/06 |
| 9,897,186 | B2 * | 2/2018 | Jin | F16H 48/285 |
| 10,794,460 | B2 * | 10/2020 | Nishiji | F16H 48/40 |
| 2009/0186739 | A1 | 7/2009 | Fujii et al. | |
| 2009/0215576 | A1 | 8/2009 | Nishiji | |
| 2018/0372202 | A1 | 12/2018 | Nishiji et al. | |

* cited by examiner

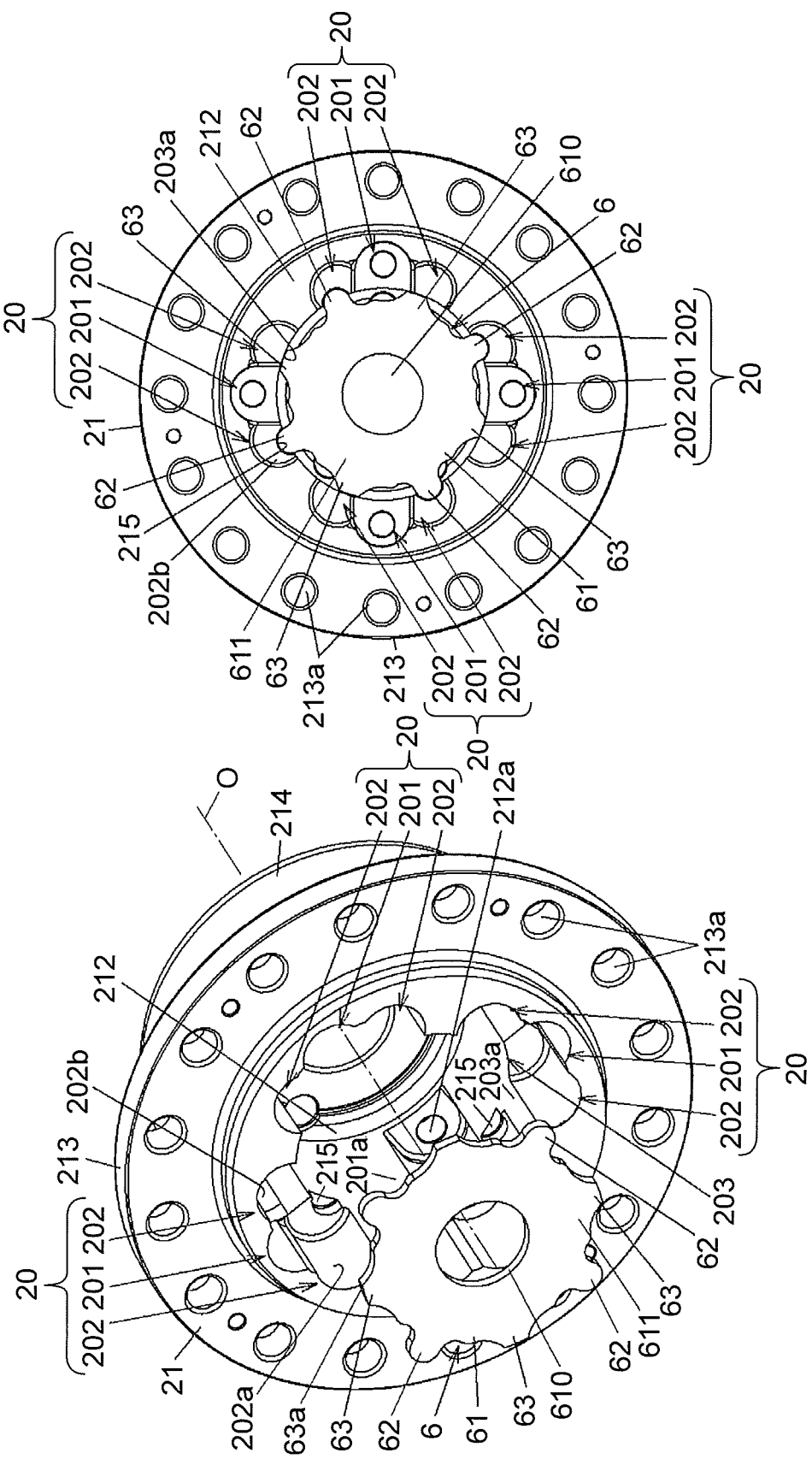

VEHICLE DIFFERENTIAL DEVICE

INCORPORATION BY REFERENCE

The disclosure of Japanese Patent Application No. 2019-050718 filed on Mar. 19, 2019 including the specification, drawings and abstract is incorporated herein by reference in its entirety.

BACKGROUND

1. Technical Field

The present disclosure relates to a vehicle differential device that can distribute an input drive force to a pair of output shafts while allowing a differential rotation thereof.

2. Description of Related Art

The vehicle differential device that can distribute the input drive force to right and left drive shafts while allowing the differential rotation thereof includes right and left side gears, a plurality of pinion gear sets, a housing, and washers. The right and left side gears rotate integrally with the right and left drive shafts, respectively. Each of the pinion gear sets includes a pair of pinion gears disposed in parallel to the right and left side gears such that the pinion gears mesh with each other. The housing holds each pinion gear of the pinion gear sets such that each pinion gear is rotatable. The washers are disposed to face axial end faces of the right and left side gears. In such a differential device, the right and left side gears and each of the pinion gears have helical teeth (twisted teeth). With the helical teeth of the right and left side gears and the helical teeth of each of the pinion gears meshing with each other, an axial thrust force is generated in the right and left side gears and the respective pinion gears. A frictional resistance force generated by the thrust force limits a differential rotation between the right and left side gears to suppress slipping of wheels of a vehicle, serving as a differential limiting force that makes it possible to improve running performance when the vehicle travels on rough roads, for example.

The applicant of the present disclosure proposes a differential device described in Japanese Unexamined Patent Application Publication No. 2009-197976 (JP 2009-197976 A) as a differential device that can be reduced in size. In the differential device, one pinion gear, of a pair of pinion gears, has a large diameter gear portion and a small diameter gear portion with different pitch circle diameters. The large diameter gear portion meshes with a left side gear of the right and left side gears, and the small diameter gear portion meshes with the other pinion gear on an outer peripheral side of the right side gear. A part of the other pinion gear meshes, in its circumferential direction, with the small diameter gear portion of the one pinion gear, and another part of the other pinion gear meshes, in its circumferential direction, with the right side gear.

SUMMARY

In the differential device described in JP 2009-197976 A, depending on a direction of relative rotation of the right and left side gears, the small diameter gear portion of the one pinion gear receives a radial force toward the right side gear. Therefore, as represented by a reference character 20F shown in FIGS. 2 and 3 of JP 2009-197976 A, a gear support portion needs to be formed in the housing (differential case) such that the gear support portion is interposed between the small diameter gear portion of the one pinion gear and the right side gear. Thus, man-hours for processing the differential case is increased. In addition, the other pinion gear meshes with the small diameter gear portion of the one pinion gear and the right side gear, that is, at two locations, in the circumferential direction. Thus, a large load is imposed on the other pinion gear when transmitting drive force, and this limits the possibility of size reduction of the other pinion gear.

Further, if diameters of the right and left side gears are reduced in order to reduce the size of the device, frictional sliding diameters between the right and left side gears and the washers are reduced, making it difficult to generate a large differential limiting force.

In view of this, the present disclosure provides a vehicle differential device that can be reduced in size while suppressing an increase in processing man-hours and a decrease in the differential limiting force.

A vehicle differential device configured to distribute drive force of a vehicle to a first output shaft and a second output shaft according to a first aspect of the present disclosure includes a first inner helical gear, a first outer helical gear, a second inner helical gear, a second outer helical gear, a housing, a friction member, and a plurality of pinion gear sets. The first inner helical gear is configured to rotate integrally with the first output shaft and has outer peripheral helical teeth on an outer peripheral surface of the first inner helical gear. The first outer helical gear is disposed on an outer periphery of the first inner helical gear and has inner peripheral helical teeth on an inner peripheral surface of the first outer helical gear. The inner peripheral helical teeth of the first outer helical gear are configured to mesh with the outer peripheral helical teeth of the first inner helical gear. The second inner helical gear is configured to rotate integrally with the second output shaft and has outer peripheral helical teeth on an outer peripheral surface of the second inner helical gear. The second outer helical gear is disposed on an outer periphery of the second inner helical gear and has inner peripheral helical teeth on an inner peripheral surface of the second outer helical gear. The inner peripheral helical teeth of the second outer helical gear are configured to mesh with the outer peripheral helical teeth of the second inner helical gear. The housing is configured to accommodate the first outer helical gear and the second outer helical gear. The friction member is disposed between the first outer helical gear and the second outer helical gear. The pinion gear sets are held in the housing. Each of the pinion gear sets includes a first pinion gear configured to mesh with the first outer helical gear, and a plurality of second pinion gears configured to mesh with the second outer helical gear. The first pinion gear integrally includes an axially one end side gear portion configured to mesh with the first outer helical gear, and an axially other end side gear portion configured to mesh with the second pinion gears. The second pinion gears are configured to mesh with the second outer helical gear at positions separated from each other in a circumferential direction of the second outer helical gear. The axially other end side gear portion of the first pinion gear is configured to mesh with the second pinion gears at positions radially outward of the second outer helical gear.

In the vehicle differential device according to the first aspect of the present disclosure, the vehicle differential device can be reduced in size while suppressing the increase in the processing man-hours and the decrease in the differential limiting force.

In the vehicle differential device according to the first aspect of the present disclosure, the housing may have a plurality of recessed fitting portions. The friction member may include a main body portion having an annular plate shape and configured such that an axial end surface of the first outer helical gear and an axial end surface of the second outer helical gear abut against the main body portion, and a plurality of fitting projections projecting radially outward from the main body portion. The fitting projections of the friction member may be fitted onto the recessed fitting portions of the housing so that the friction member is restrained from rotating with respect to the housing.

In the vehicle differential device according to the first aspect of the present disclosure, the friction member may have a plurality of abutting projections projecting radially outward from the main body portion and disposed between the fitting projections. The abutting projections of the friction member may abut against an inner peripheral surface of the housing so that the friction member is positioned with respect to the housing in a radial direction.

In the vehicle differential device according to the first aspect of the present disclosure, a pitch circle diameter of the second outer helical gear may be smaller than a pitch circle diameter of the first outer helical gear.

In the vehicle differential device according to the first aspect of the present disclosure, the first pinion gear and the second pinion gears may have helical teeth on outer peripheral surfaces of the first pinion gear and the second pinion gears. In the first pinion gear, a pitch circle diameter of the axially other end side gear portion may be smaller than a pitch circle diameter of the axially one end side gear portion, and a twist angle of a tooth trace in the axially other end side gear portion may be smaller than a twist angle of a tooth trace in the axially one end side gear portion.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4A is a perspective view showing a center washer and a first housing member; and FIG. 4B is a structural view of the center washer and the first housing member as viewed in an axial direction.

DETAILED DESCRIPTION OF EMBODIMENTS

Embodiment

An embodiment of the present disclosure will be described with reference to FIGS. 1 to 4. Note that the embodiment described below is represented as a specific example suitable for implementing the present disclosure. Although some parts exemplify various technical matters that are technically preferable, the technical scope of the present disclosure is not limited to the specific examples.

Figure 1:
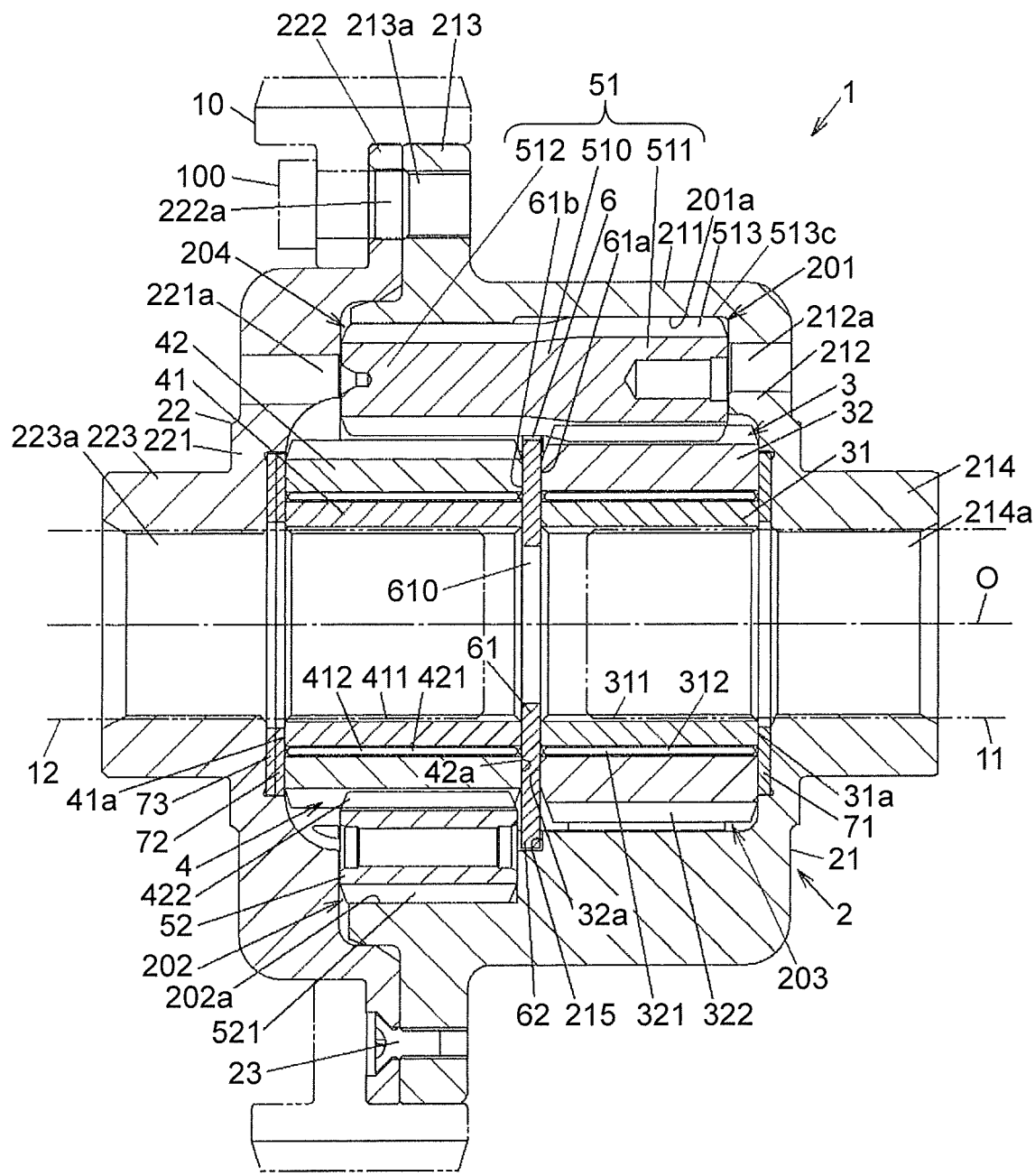
FIG. 1 is a sectional view of a differential device according to an embodiment of the present disclosure.
Figure 2:
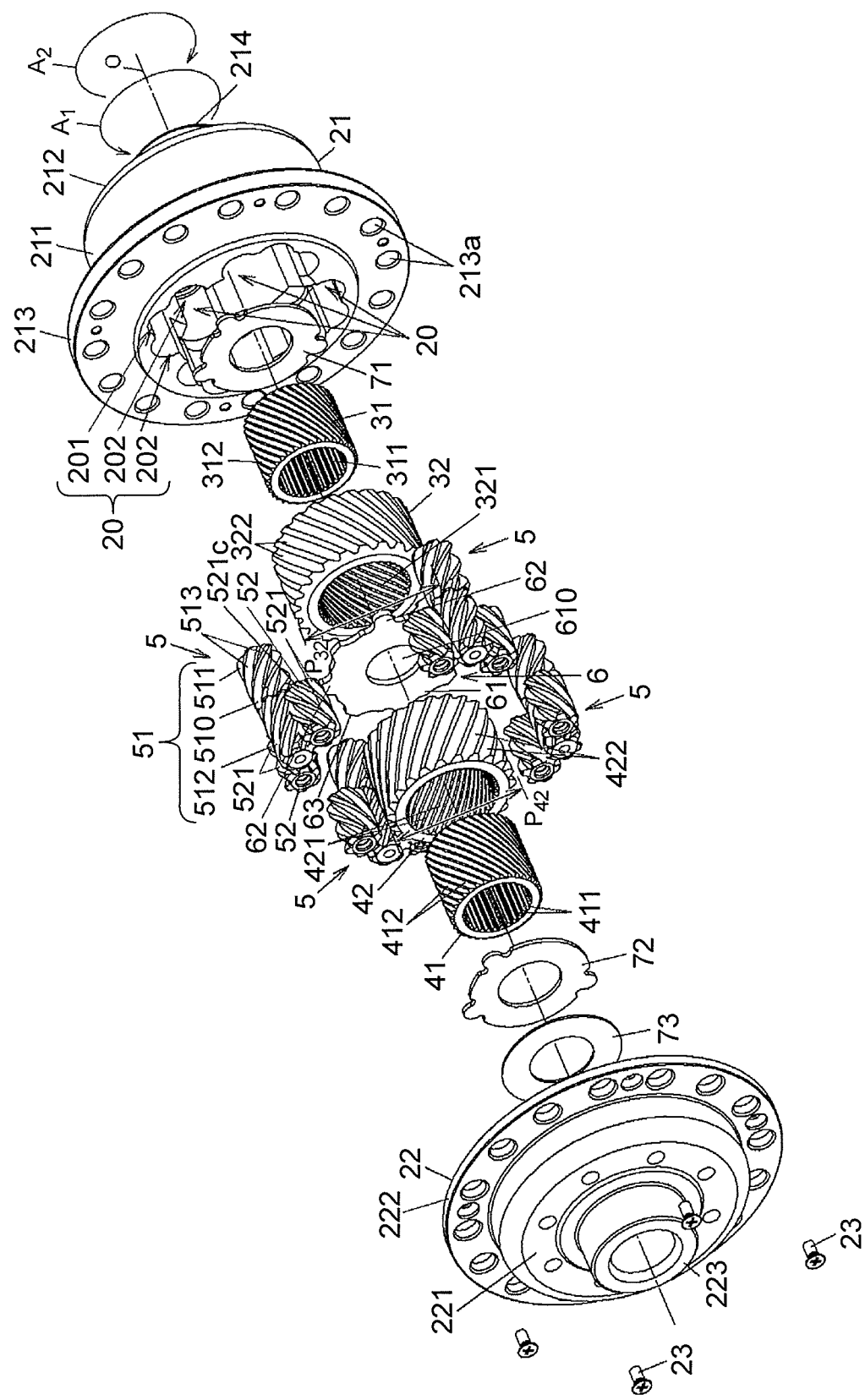
FIG. 2 is an exploded perspective view of the differential device.

FIG. 1 is a sectional view of a differential device according to the embodiment of the present disclosure. FIG. 2 is an exploded perspective view of the differential device.

A differential device 1 that is mounted on a vehicle is used to distribute a drive force (torque), which is input from a ring gear 10, from a driving source of the vehicle, such as an engine, to the first and second output shafts 11 and 12 while allowing a differential rotation thereof. In FIG. 1, the ring gear 10 and the first and second output shafts 11 and 12 are indicated by virtual lines (long dashed double-short dashed lines). In FIG. 2, a rotation direction of the differential device 1 when the vehicle travels forward is indicated by an arrow $A_1$, and the rotation direction of the differential device 1 when the vehicle moves backward is indicated by an arrow $A_2$. In the embodiment, a case where the first and second output shafts 11 and 12 serve as drive shafts respectively connected to the right and left wheels is described. However, the differential device 1 may be mounted on a four-wheel drive vehicle to be used as a center differential that distributes a drive force to front and rear propeller shafts.

The differential device 1 includes a housing 2, first and second helical gear pairs 3 and 4, a plurality of pinion gear sets 5, a center washer 6, first and second side washers 71 and 72, and a gap adjusting shim 73. The housing 2 rotates about a rotation axis O together with the ring gear 10. The first and second helical gear pairs 3 and 4 are accommodated in the housing 2 and disposed side by side along the rotation axis O. The pinion gear sets 5 are held in the housing 2. The center washer 6 is disposed between the first helical gear pair 3 and the second helical gear pair 4 and serves as a friction member. The first and second side washers 71 and 72 are disposed such that the first and second helical gear pairs 3 and 4 are sandwiched between the center washer 6 and the first and second side washers 71 and 72. Hereinafter, a direction parallel to the rotation axis O is referred to as an axial direction. The center washer 6 and the first and second side washers 71 and 72 are restricted from rotating with respect to the housing 2.

The first helical gear pair 3 includes a first inner helical gear 31 that rotates integrally with the first output shaft 11, and a first outer helical gear 32 that is disposed on an outer periphery of the first inner helical gear 31. Spline teeth 311 for connecting with the first output shaft 11 are formed on an inner peripheral surface of the first inner helical gear 31, and outer peripheral helical teeth 312 are formed on an outer peripheral surface of the first inner helical gear 31. Inner peripheral helical teeth 321 are formed on an inner peripheral surface of the first outer helical gear 32, and outer peripheral helical teeth 322 are formed on an outer peripheral surface of the first outer helical gear 32.

The outer peripheral helical teeth 312 of the first inner helical gear 31 and the inner peripheral helical teeth 321 of the first outer helical gear 32 mesh with each other. When torque is transmitted from the first outer helical gear 32 to the first inner helical gear 31, an axial thrust force acts on the first inner helical gear 31 due to the torque transmission, and a thrust force serving as a reaction to the axial thrust force acts on the first outer helical gear 32.

As shown in FIG. 2, a twist direction of a tooth trace of the outer peripheral helical teeth 322 of the first outer helical gear 32 and a twist direction of a tooth trace of the outer peripheral helical teeth 312 of the first inner helical gear 31 are directions that are opposite to each other. In the embodiment, twisted directions of the tooth traces of the inner peripheral helical teeth 321 of the first outer helical gear 32 and the outer peripheral helical teeth 312 of the first inner helical gear 31 are set such that the first outer helical gear 32 is pressed toward the center washer 6 and the first inner helical gear 31 is pressed toward the first side washer 71 when the vehicle travels forward. In contrast, when the vehicle moves backward, the first outer helical gear 32 is pressed toward the first side washer 71 and the first inner helical gear 31 is pressed toward the center washer 6.

The second helical gear pair 4 includes a second inner helical gear 41 that rotates integrally with the second output shaft 12, and a second outer helical gear 42 disposed on an outer periphery of the second inner helical gear 41. Spline teeth 411 for connecting with the second output shaft 12 are formed on an inner peripheral surface of the second inner helical gear 41, and outer peripheral helical teeth 412 are formed on an outer peripheral surface of the second inner helical gear 41. Inner peripheral helical teeth 421 are formed on an inner peripheral surface of the second outer helical gear 42, and outer peripheral helical teeth 422 are formed on an outer peripheral surface of the second outer helical gear 42.

The outer peripheral helical teeth 412 of the second inner helical gear 41 and the inner peripheral helical teeth 421 of the second outer helical gear 42 mesh with each other. When torque is transmitted from the second outer helical gear 42 to the second inner helical gear 41, an axial thrust force acts on the second inner helical gear 41 due to the torque transmission, and a thrust force serving as a reaction to the axial thrust force acts on the second outer helical gear 42.

A twist direction of a tooth trace of the outer peripheral helical teeth 422 of the second outer helical gear 42 and a twist direction of a tooth trace of the outer peripheral helical teeth 412 of the second inner helical gear 41 are directions that are opposite to each other. In the embodiment, twisted directions of the tooth traces of the inner peripheral helical teeth 421 of the second outer helical gear 42 and the outer peripheral helical teeth 412 of the second inner helical gear 41 are set such that the second outer helical gear 42 is pressed toward the center washer 6 and the second inner helical gear 41 is pressed toward the second side washer 72 when the vehicle travels forward. In contrast, when the vehicle moves backward, the second outer helical gear 42 is pressed toward the second side washer 72, and the second inner helical gear 41 is pressed toward the center washer 6.

A pitch circle diameter $P_{42}$ (see FIG. 2) of the second outer helical gear 42 is smaller than a pitch circle diameter $P_{32}$ (see FIG. 2) of the first outer helical gear 32. The twisted direction of the tooth trace of the outer peripheral helical teeth 322 of the first outer helical gear 32 and the twisted direction of the tooth trace of the outer peripheral helical teeth 422 of the second outer helical gear 42 are inverse to each other.

Each of the pinion gear sets 5 is constituted by one first pinion gear 51 and two second pinion gears 52. The first pinion gear 51 integrally includes an axially one end side gear portion 511 that meshes with the first outer helical gear 32 and an axially other end side gear portion 512 that meshes with the two second pinion gears 52. The second pinion gears 52 mesh with the second outer helical gear 42 while meshing with the axially other end side gear portion 512 of the first pinion gear 51.

The axially other end side gear portion 512 of the first pinion gear 51 meshes with the two second pinion gears 52 at a position radially outward of the second outer helical gear 42. A space is formed between the axially other end side gear portion 512 of the first pinion gear 51 and the second outer helical gear 42, and a support portion for supporting the first pinion gear 51 is not provided in the space. Tilting of the first pinion gear 51 in a direction in which the axially other end side gear portion 512 approaches the second outer helical gear 42 is suppressed through meshing of the first pinion gear 51 with the two second pinion gears 52. The two second pinion gears 52 mesh with the second outer helical gear 42 at positions separated from each other in the circumferential direction of the second outer helical gear 42.

Figure 3:
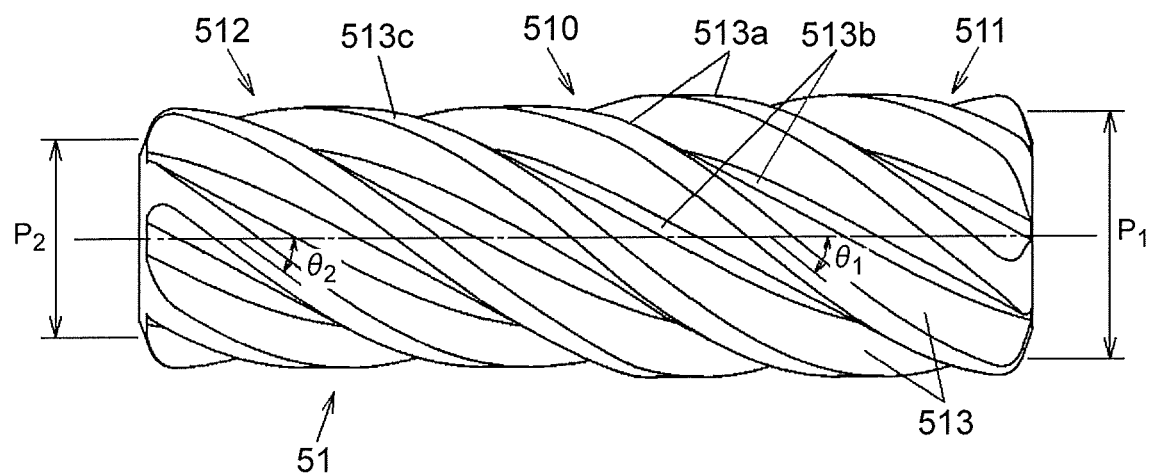
FIG. 3 is a side view showing a first pinion gear alone.

FIG. 3 is a side view showing the first pinion gear 51 alone. The first pinion gear 51 has six helical teeth 513 formed in a spiral shape on an outer peripheral surface thereof. Each of the helical teeth 513 has a tooth trace 513a and a tooth groove 513b formed continuously over the axially one end side gear portion 511 and the axially other end side gear portion 512. A tooth tip surface 513c of each of the helical teeth 513 has a predetermined width in a circumferential direction of the first pinion gear 51.

The axially one end side gear portion 511 is larger in outer diameter than the axially other end side gear portion 512. When a pitch circle diameter of the axially one end side gear portion 511 is referred to as $P_1$, and a pitch circle diameter of the axially other end side gear portion 512 is referred to as $P_2$, $P_1$ is larger than $P_2$, and the ratio of $P_1$ to $P_2$ ($P_1/P_2$) is, for example, 1.05 to 1.15. In an example shown in FIG. 3, the ratio is set to approximately 1.1. When a twist angle of the tooth trace 513a in the axially one end side gear portion 511 is referred to as $\theta_1$, and a twist angle of the tooth trace 513a in the axially other end side gear portion 512 is referred to as $\theta_2$, $\theta_1$ is larger than $\theta_2$, and the ratio of $\theta_1$ to $\theta_2$ is, for example, the same as the ratio of the pitch circle diameters of the axially one end side gear portion 511 and the axially other end side gear portion 512.

In a central portion 510 of the first pinion gear 51, the pitch circle diameter and the twist angle are gradually reduced from those of the axially one end side gear portion 511 to those of the axially other end side gear portion 512, so that stress is not concentrated in the central portion 510. Each of the second pinion gears 52 has six helical teeth 521 that mesh with the helical teeth 513 of the axially other end side gear portion 512 of the first pinion gear 51, and a pitch circle diameter of each of the second pinion gears 52 is equal to $P_2$ and the twist angle thereof is equal to $\theta_2$.

As described above, the pitch circle diameter $P_2$ of the axially other end side gear portion 512 is smaller than the pitch circle diameter $P_1$ of the axially one end side gear portion 511, and the twist angle $\theta_2$ of the tooth trace of the axially other end side gear portion 512 is smaller than the twist angle $\theta_1$ of the tooth trace of the axially one end side gear portion 511. Thus, a TBR (torque bias ratio) when the first helical gear pair 3 rotates faster than the second helical gear pair 4 (for example, when the vehicle turns right) and the TBR when the second helical gear pair 4 rotates faster than the first helical gear pair 3 (for example, when the vehicle turns left) are equalized.

That is, in the embodiment, the pitch circle diameter $P_{32}$ of the first outer helical gear 32 is larger than the pitch circle diameter $P_{42}$ of the second outer helical gear 42. If the twist angle $\theta_1$ of the tooth trace of the axially one end side gear portion 511 is equal to the twist angle $\theta_2$ of the tooth trace of the axially other end side gear portion 512, a difference in diameter between the first outer helical gear 32 and the second outer helical gear 42 causes a deviation in a differential limiting force, which limits differential rotation of the first outer helical gear 32 and the second outer helical gear 42, between right turning and left turning of the vehicle. However, in the embodiment, since the first pinion gear 51 is constituted as described above, such imbalance in the TBR is suppressed.

The housing 2 includes a first housing member 21 having a bottomed cylindrical shape, and a second housing member 22 fixed to a portion of the first housing member 21 on its open side. The first housing member 21 accommodates the first and second helical gear pairs 3 and 4. The first housing member 21 has bores 20 serving as pinion gear accommodating spaces for holding the first pinion gear 51 and the two second pinion gears 52. In the embodiment, as shown in FIG. 2, since the differential device 1 has four pinion gear sets 5, four bores 20 are formed in the first housing member 21.

In each of the bores 20, a first accommodation space 201 that accommodates the first pinion gear 51 and two second accommodation spaces 202 that accommodate the two second pinion gears 52 communicate with each other. The two second accommodation spaces 202 are formed at both ends of each of the bores 20 in the circumferential direction of the first housing member 21. The first accommodation space 201 is formed between the two second accommodation spaces 202. The first accommodation space 201 and the two second accommodation spaces 202 are open at the end of the first housing member 21 on its open side.

When the first pinion gear 51 rotates inside the bore 20, the tooth tip surface 513c of the helical teeth 513 of the first pinion gear 51 slides on an inner surface 201a of the first accommodation space 201. Further, when the second pinion gear 52 rotates inside the bore 20, a tooth tip surface 521c of the helical teeth 521 of the second pinion gear 52 slides on an inner surface 202a of the second accommodation space 202. Frictional force generated on the tooth tip surfaces 513c and 521c of the first and second pinion gears 51 and 52, respectively, due to the sliding, serves as the differential limiting force that limits the differential rotation between the first and second output shafts 11 and 12.

The first housing member 21 integrally includes a cylindrical portion 211 having four bores 20, a bottom portion 212 projecting inward from one end portion of the cylindrical portion 211, a flange portion 213 projecting outward from the other end portion of the cylindrical portion 211, and a tube portion 214 projecting from a center portion of the bottom portion 212 in the axial direction and through which the first output shaft 11 is inserted. An oil groove 214a for allowing lubricating oil to flow is formed on an inner surface of the tube portion 214.

The first accommodation space 201 and the second accommodation space 202 extend from the end portion of the first housing member 21 on its open side toward the bottom portion 212 in the axial direction of the cylindrical portion 211. An axial length of the second accommodation space 202 is shorter than an axial length of the first accommodation space 201. The bottom portion 212 has an oil hole 212a for circulating the lubricating oil between the first accommodation space 201 and the outside of the housing 2.

At a center portion of the cylindrical portion 211 of the first housing member 21, a first hollow portion 203 serving as an accommodation space for accommodating the first helical gear pair 3, and a second hollow portion 204 serving as an accommodation space for accommodating the second helical gear pair 4 are formed side by side in the axial direction. The first hollow portion 203 is provided on a deep side (the bottom portion 212 side) of the first housing member 21, and the second hollow portion 204 is provided on the open side of the first housing member 21. The first hollow portion 203 communicates with the first accommodation space 201 of the bore 20 and does not communicate with the second accommodation space 202. The second hollow portion 204 communicates with the first accommodation space 201 and the second accommodation space 202 of the bore 20. The first side washer 71 is disposed between the first inner helical gear 31 and the bottom portion 212 of the first housing member 21.

The second housing member 22 integrally includes an annular plate portion 221 that closes one end of each of the bores 20 on the open side of the first housing member 21, a flange portion 222 that abuts against the flange portion 213 of the first housing member 21, and a tube portion 223 that projects from the annular plate portion 221 in the axial direction and through which the second output shaft 12 is inserted. An oil groove 223a for allowing the lubricating oil to flow is formed on an inner surface of the tube portion 223. The second side washer 72 is disposed between the second inner helical gear 41 and the annular plate portion 221 of the second housing member 22. An oil hole 221a for circulating the lubricating oil is formed in the annular plate portion 221 so as to penetrate the annular plate portion 221 in the axial direction.

The flange portion 213 of the first housing member 21 and the flange portion 222 of the second housing member 22 are fastened by a plurality of bolts 23. The housing 2 is rotatably supported on a differential carrier by a bearing (not shown) so as to rotate about the rotation axis θ. Bolt insertion holes 213a and 222a are formed in the flange portions 213 and 222 of the first and second housing members 21 and 22, respectively. Shaft portions of bolts 100 for fixing the ring gear 10 to the housing members 21 and 22 are inserted through the bolt insertion holes 213a and 222a.

FIG. 4A is a perspective view showing the center washer 6 and the first housing member 21, and FIG. 4B is a structural view of the center washer 6 and the first housing member 21 as seen in the axial direction.

The center washer 6 is disposed between the first outer helical gear 32 and the second outer helical gear 42. The center washer 6 integrally includes an annular plate-shaped main body portion 61, a plurality of fitting projections 62, and a plurality of abutting projections 63. Axial end surfaces 32a and 42a of the first outer helical gear 32 and the second outer helical gear 42, respectively, abut against the main body portion 61 when the vehicle travels forward. The fitting projections 62 and the abutting projections 63 project radially outward from the main body portion 61. The main body portion 61 has a through hole 610 at its center portion.

The first housing member 21 has a plurality of recessed fitting portions 215 into which the fitting projections 62 of the center washer 6 are respectively fitted. In the embodiment, the center washer 6 has four fitting projections 62, and the same number of recessed fitting portions 215 are formed in the first housing member 21. Further, in the embodiment, the recessed fitting portions 215 are recessed from a bottom surface 202b of the second accommodation space 202 in the axial direction. With the fitting projections 62 fitted into the recessed fitting portions 215, the center washer 6 is restrained from rotating with respect to the housing 2.

The abutting projections 63 of the center washer 6 are provided between the fitting projections 62 in the circumferential direction of the main body portion 61. Distal end surfaces 63a of the abutting projections 63 are formed in an arc shape with a curvature matching a curvature of an inner peripheral surface 203a of the first hollow portion 203 of the first housing member 21. With the abutting projections 63 of the center washer 6 abutting against the inner peripheral surface 203a of the first hollow portion 203, the center washer 6 is positioned with respect to the housing 2 in the radial direction.

Although not shown, the first outer helical gear 32 and the second outer helical gear 42 may include an annular projection which protrudes radially inward and which is provided at the end on the center washer 61 side. In this case, a part of the main body portion 61 of the center washer 6 may be disposed between the annular projection of the first outer helical gear 32 and an annular projection of the second outer helical gear 42. Furthermore, although not shown, the inner diameter of the through hole 610 may be smaller than the inner diameter of a portion of the first outer helical gear 32 where the annular projection of the first outer helical gear 32 is formed and the inner diameter of a portion of the second outer helical gear 42 where the annular projection of the second outer helical gear 42 is formed. Thereby, for example, compared with the case where the first and second outer helical gears 32 and 42 do not have the annular projections, a contact area between the center washer 6 and the axial end surface 32a of the first outer helical gear 32, and a contact area between the center washer 6 and the axial end surface 42a of the second outer helical gear 42 are increased, and wear of the axial end surfaces 32a and 42a is suppressed.

Operation of Differential Device 1

When the housing 2 is rotated by the drive force input from the ring gear 10, the drive force is transmitted to the pinion gear sets 5 held by the cylindrical portion 211 of the first housing member 21, and is distributed from the first pinion gear 51 to the first outer helical gear 32, and from the second pinion gears 52 to the second outer helical gear 42. Then, the drive force is output from the first outer helical gear 32 to the first output shaft 11 via the first inner helical gear 31, and from the second outer helical gear 42 to the second output shaft 12 via the second inner helical gear 41.

When the vehicle travels forward, the first outer helical gear 32 receives a thrust force toward the center washer 6 by meshing with the first pinion gear 51 and also by meshing with the first inner helical gear 31. Due to the thrust forces, a frictional force is generated between the axial end surface 32a of the first outer helical gear 32 and the center washer 6. Further, the first inner helical gear 31 receives a thrust force toward the first side washer 71 by meshing with the first outer helical gear 32, and thus a frictional force is generated between the axial end surface 31a of the first inner helical gear 31 and the first side washer 71.

Similarly, the second outer helical gear 42 receives a thrust force toward the center washer 6 by meshing with the second pinion gears 52, and also by meshing with the second inner helical gear 41. Due to the thrust forces, a frictional force is generated between the axial end surface 42a of the second outer helical gear 42 and the center washer 6. Further, the second inner helical gear 41 receives a thrust force toward the second side washer 72 by meshing with the second outer helical gear 42, and thus a frictional force is generated between the axial end surface 41a of the second inner helical gear 41 and the second side washer 72.

The frictional forces serve as differential limiting forces that limit the differential rotation between the first and second output shafts 11 and 12. Thus, slipping of the right and left wheels is suppressed, and running performance when traveling on rough roads is improved.

Effects of Embodiment

According to the embodiment described above, the differential limiting force when the vehicle travels forward is increased due to the thrust force generated by the meshing between the first outer helical gear 32 and the first inner helical gear 31 and the thrust force generated by the meshing between the second outer helical gear 42 and the second inner helical gear 41.

Further, since the first pinion gear 51 and the second pinion gears 52 mesh with each other on the outer peripheral side of the second outer helical gear 42, the differential device can be reduced in size in the axial direction. In addition, since the two second pinion gears 52 mesh with the one first pinion gear 51, load applied on each second pinion gear 52 can be reduced during transmission of the drive force, and the second pinion gears 52 can be reduced in size.

Still further, it is possible to avoid interference between the first pinion gear 51 and the second outer helical gear 42 while eliminating the need of a configuration corresponding to a gear support portion 20F (a member interposed between the first pinion gear 51 and the second outer helical gear 42) that is required in the differential device described in JP 2009-197976 A. Thus, an increase in man-hours for processing the housing 2 can be suppressed.

Appendix

Although the present disclosure has been described based on the embodiment, the embodiment does not limit the applicable embodiment according to the claims. It should be noted that all combinations of the features described in the embodiment are not essential for the solution of the present disclosure to the problem.

Further, in order to implement the present disclosure, the embodiment can be modified as appropriate without departing from the spirit of the present disclosure. For example, in the embodiment described above, a case where the differential device 1 includes the four pinion gear sets 5 has been described, but the applicable embodiment is not limited thereto. The differential device 1 may have two, three, or five or more pinion gear sets 5.

As long as the interference between the first pinion gear 51 and the second outer helical gear 42 can be avoided, the pitch circle diameter of the second outer helical gear 42 may be the same as the pitch circle diameter of the first outer helical gear 32. In addition, the pitch circle diameter of the axially other end side gear portion 512 of the first pinion gear 51 may be the same as the pitch circle diameter of the axially one end side gear portion 511 of the first pinion gear 51.

What is claimed is:

1. A vehicle differential device configured to distribute drive force of a vehicle to a first output shaft and a second output shaft, the vehicle differential device comprising:
a first inner helical gear configured to rotate integrally with the first output shaft and having outer peripheral helical teeth on an outer peripheral surface of the first inner helical gear;
a first outer helical gear disposed on an outer periphery of the first inner helical gear and having inner peripheral helical teeth on an inner peripheral surface of the first outer helical gear, the inner peripheral helical teeth of the first outer helical gear configured to mesh with the outer peripheral helical teeth of the first inner helical gear;
a second inner helical gear configured to rotate integrally with the second output shaft and having outer peripheral helical teeth on an outer peripheral surface of the second inner helical gear;
a second outer helical gear disposed on an outer periphery of the second inner helical gear and having inner peripheral helical teeth on an inner peripheral surface of the second outer helical gear, the inner peripheral helical teeth of the second outer helical gear configured to mesh with the outer peripheral helical teeth of the second inner helical gear;
a housing configured to accommodate the first outer helical gear and the second outer helical gear;
a friction member disposed between the first outer helical gear and the second outer helical gear; and a plurality of pinion gear sets held in the housing, each of the pinion gear sets including
a first pinion gear configured to mesh with the first outer helical gear, and
a plurality of second pinion gears configured to mesh with the second outer helical gear, the first pinion gear integrally including
an axially one end side gear portion configured to mesh with the first outer helical gear, and
an axially other end side gear portion configured to mesh with the second pinion gears, the second pinion gears being configured to mesh with the second outer helical gear at positions separated from each other in a circumferential direction of the second outer helical gear, and the axially other end side gear portion of the first pinion gear being configured to mesh with the second pinion gears at positions radially outward of the second outer helical gear.

2. The vehicle differential device according to claim 1, wherein:
the housing has a plurality of recessed fitting portions;
the friction member includes
a main body portion having an annular plate shape and configured such that an axial end surface of the first outer helical gear and an axial end surface of the second outer helical gear abut against the main body portion, and
a plurality of fitting projections projecting radially outward from the main body portion; and
the fitting projections of the friction member are fitted onto the recessed fitting portions of the housing such that the friction member is restrained from rotating with respect to the housing.

3. The vehicle differential device according to claim 2, wherein:
the friction member has a plurality of abutting projections projecting radially outward from the main body portion and disposed between the fitting projections; and
the abutting projections of the friction member abut against an inner peripheral surface of the housing such that the friction member is positioned with respect to the housing in a radial direction.

4. The vehicle differential device according to claim 1, wherein a pitch circle diameter of the second outer helical gear is smaller than a pitch circle diameter of the first outer helical gear.

5. The vehicle differential device according to claim 1, wherein:
the first pinion gear and the second pinion gears have helical teeth on outer peripheral surfaces of the first pinion gear and the second pinion gears; and
in the first pinion gear, a pitch circle diameter of the axially other end side gear portion is smaller than a pitch circle diameter of the axially one end side gear portion, and a twist angle of a tooth trace in the axially other end side gear portion is smaller than a twist angle of a tooth trace in the axially one end side gear portion.

* * * * *